United States Patent
Mok et al.

(10) Patent No.: US 9,095,939 B2
(45) Date of Patent: Aug. 4, 2015

(54) METHOD AND APPARATUS FOR MANUFACTURING MAGNETIC DRAWING BOARD

(71) Applicants: Ching Chi Mok, Tsuen Wan (HK); Hai Zhan Lao, Guang Dong Province (CN)

(72) Inventors: Ching Chi Mok, Tsuen Wan (HK); Hai Zhan Lao, Guang Dong Province (CN)

(73) Assignee: Earth Magnets MFG. (Kai Ping) Co., Ltd., Guang Dong Province (CN)

( * ) Notice: Subject to any disclaimer, the term of this patent is extended or adjusted under 35 U.S.C. 154(b) by 0 days.

(21) Appl. No.: 13/954,990

(22) Filed: Jul. 31, 2013

(65) Prior Publication Data

US 2015/0033536 A1 Feb. 5, 2015

(51) Int. Cl.
| B43L 1/00 | (2006.01) |
| B23P 19/04 | (2006.01) |
| G02F 1/09 | (2006.01) |
| G02F 1/1333 | (2006.01) |

(52) U.S. Cl.
CPC ............... B23P 19/04 (2013.01); B43L 1/008 (2013.01); G02F 1/09 (2013.01); G02F 1/133377 (2013.01); G02F 2001/094 (2013.01); G02F 2203/12 (2013.01); G02F 2203/34 (2013.01)

(58) Field of Classification Search
USPC .............. 434/404, 409, 410; 446/131, 132; 428/323, 328, 329
See application file for complete search history.

(56) References Cited

U.S. PATENT DOCUMENTS

| 3,982,334 | A | * | 9/1976 | Tate | 434/409 |
| 4,143,472 | A | * | 3/1979 | Murata et al. | 434/409 |
| 5,949,050 | A | * | 9/1999 | Fosbenner et al. | 235/449 |
| 6,103,347 | A | * | 8/2000 | Nojima et al. | 428/174 |
| 6,196,848 | B1 | * | 3/2001 | Yamazaki | 434/409 |
| 6,629,847 | B1 | * | 10/2003 | Satoh | 434/409 |
| 6,705,874 | B1 | * | 3/2004 | Koyama | 434/409 |
| 6,733,298 | B2 | * | 5/2004 | Chen | 434/409 |
| 6,943,772 | B2 | * | 9/2005 | Yasuda | 345/107 |
| 7,015,892 | B1 | * | 3/2006 | Nihira et al. | 345/107 |
| 2008/0274445 | A1 | * | 11/2008 | Murakata et al. | 434/409 |

* cited by examiner

*Primary Examiner* — Kurt Fernstrom

(57) ABSTRACT

The present invention provides a method and apparatus for manufacturing a magnetic drawing board having a plurality of areas, each of which is designated with a specific color, with clear border between adjacent areas of different color. The present invention makes use of magnetic force to ensure that magnetic particles of a specific color will be filled into cells designated for that specific color. As a result, the present invention is capable of manufacturing a magnetic drawing board with a clear division of areas of different colors. There is no longer any limitation on the size and shape of the areas of different colors in the present invention.

14 Claims, 3 Drawing Sheets

METHOD AND APPARATUS FOR MANUFACTURING MAGNETIC DRAWING BOARD

BACKGROUND OF THE INVENTION

Magnetic drawing boards have been introduced to markets for many years. They are a popular form of erasable drawing board which in many times serve as a replacement for conventional drawing utensils such as ink and crayons. Parents consider that magnetic drawing boards provide a cleaner and safer alternative for their children to draw. Magnetic drawing boards are now common toys for children and very often they serve educational purposes.

A typical magnetic drawing board found in the market is the one which comprises mainly an upper substrate forming a magnetic display panel, a lower substrate, and a honeycomb structure sealedly arranged therebetween with each cell of the honeycomb structure encapsulated with a dispersion medium and magnetic particles. When a user draws a line on the upper substrate with a magnetic pen, the magnetic particles in the cell underneath the point of contact between the tip of the magnetic pen and the upper substrate will be drawn upwards towards the upper substrate, thereby forming a line on the upper substrate. When a user uses the magnetic eraser (usually in form of a magnetic strip slidably attached to the lower substrate) to remove the line, the magnetic particles in the cell on top of the point of contact between the magnetic eraser and the lower substrate will be drawn downwards towards the lower substrate, thereby rendering the line on the upper substrate to disappear.

In some magnetic drawing boards, it is possible to attain multi-color display. In such case, the drawing board is divided into a number of areas, and the cells in each area are encapsulated with magnetic particles of a color specific for that area. Therefore, when the user draws a line on the upper substrate with a magnetic pen in one area in which the cells are encapsulated with magnetic particles of a specific color, the line appeared on the upper substrate will be in that specific color in that area.

The existing method to manufacture the aforementioned magnetic drawing board with multi-color display is as follows: (1) the honeycomb structure is attached to the lower substrate; (2) a mesh which is partitioned into a plurality of areas is placed on top of the honeycomb structure, and each of the areas is designated with a specific color; (3) magnetic particles of the specific colors are placed onto the corresponding areas of the mesh designated with corresponding specific colors, so that all areas of the mesh are filled with magnetic particles of corresponding specific colors; (4) the magnetic particles are brushed to pass through the mesh and fall into the honeycomb structure, so that all cells in the honeycomb structure are correspondingly filled with magnetic particles of specific colors; (5) the cells are then filled with dispersion medium; (6) finally the upper substrate is sealingly attached onto the honeycomb structure. The existing method is disadvantageous in that it is impossible to achieve fine division of areas of different colors. This is because when the magnetic particles of a specific color pass through the mesh and fall into the cells of the honeycomb structure designated for that specific color, some of the magnetic particles may escape to adjacent cells designated for a different color through gaps between the mesh and the honeycomb structure. As a result, the border of the areas of different colors is always unclear as the cells contain magnetic particles of different colors. As a result, there is a limit on the size and shape of the areas of different color.

BRIEF SUMMARY OF THE INVENTION

An object of the present invention is to provide a method for manufacturing a magnetic drawing board having a plurality of areas, each of which is designated with a specific color, with clear border between adjacent areas of different color.

To attain this, the method of the present invention comprises the following steps:

(1) Providing a receiving member having a plurality of cells for receiving magnetic particles, wherein the cells are divided into a plurality of areas and each of the areas is designated for receiving magnetic particles of a specific color;

(2) Positioning a magnetic board on top of magnetic particles of a first specific color so that the magnetic particles of the first specific color are attracted to the magnetic board, and thereafter positioning the magnetic board attracted with the magnetic particles of the first specific color in relation to the receiving member in such a way that by means of a magnet having a magnetic force stronger than that of the magnetic board the magnetic particles of the first specific color are attracted from the magnetic board to the cells of the receiving member which are within a first one of the plurality of areas designated for receiving magnetic particles of the first specific color;

(3) Repeating step (2) to fill the cells of the receiving member which are within a subsequent one of the plurality of areas designated for receiving magnetic particles of a subsequent specific color, until all the cells of the receiving member are filled with magnetic particles;

(4) Filling all the cells of the receiving member with dispersion medium; and (5) Attaching an upper substrate onto the receiving member in a sealed manner so that the cells are sealed from each other, thereby forming the magnetic drawing board.

In step (2), the magnetic board for attracting the magnetic particles of the first specific color is of an area which is the same as the first one of the plurality of areas designated for receiving magnetic particles of the first specific color; alternatively, the magnet is of an area which is the same as the first one of the plurality of areas designated for receiving magnetic particles of the first specific color; alternatively, the magnetic board for attracting the magnetic particles of the first specific color is of an area which is larger than the first one of the plurality of areas designated for receiving magnetic particles of the first specific color; the magnet is of an area which is larger than the first one of the plurality of areas designated for receiving magnetic particles of the first specific color; the magnetic board is attracted with magnetic particles of the first specific color only at an area which is the same as the first one of the plurality of areas designated for receiving magnetic particles of the first specific color, e.g. by positioning the magnetic board on top of a container which receives magnetic particles of the first specific color, wherein the container is cylindrical and has a cross section which is the same as the first one of the plurality of areas designated for receiving magnetic particles of the first specific color.

In a further embodiment, in step (2), simultaneously positioning one or more further magnetic boards each on top of magnetic particles of a specific color, and thereafter positioning the one or more further magnetic boards attracted with magnetic particles in relation to the receiving member in such a way that by means of the magnet the magnetic particles are attracted from the magnetic boards to the cells of the receiving member so that each of the cells receives magnetic particles of the specific color designated for the cell. In particular, after the magnetic boards are attracted with magnetic particles, the magnetic boards are assembled to form an assembled magnetic board; then the assembled magnetic board is positioned in relation to the receiving member; and then the magnet is positioned in such a way that the magnetic particles are attracted from the assembled magnetic board to the cells of the receiving member.

Further, in Step (2), the magnet is positioned underneath the receiving member after the magnetic board attracted with the magnetic particles is positioned above the receiving member.

Further, in Step (2), before the magnetic board attracted with magnetic particles is properly positioned in relation to the receiving member, the receiving member and the magnetic board is separated from each other by a distance which is sufficient to prevent the magnet from attracting the magnetic particles from the magnetic board to the receiving member.

The present invention also provides an apparatus for filling receiving members of magnetic drawing boards with magnetic particles, comprising:

one or more receiving members, each of which has a plurality of cells for receiving magnetic particles, wherein the cells are divided into a plurality of areas and each of the areas is designated for receiving magnetic particles of a specific color;

a magnet fixedly secured underneath each of the receiving members;

a receiving member conveyor for conveying the receiving members along a plurality of operating positions;

each of the operating positions is disposed with:

a magnetic particles releasing area for receiving the receiving member;

a magnetic particles attracting area which is laterally aligned with the magnetic particles releasing area;

a container for receiving magnetic particles of a specific color, and the container is disposed at the magnetic particles attracting area;

a magnetic board holder fixedly securely with a magnetic board; and the magnetic board holder is movable between the magnetic particles releasing area and the magnetic particles attracting area so as to enable the magnetic board to attract magnetic particles from the container and thereafter move to a position in relation to the receiving member in such a way that by means of the magnet which has a magnetic force stronger than that of the magnetic board the magnetic particles of the specific color are attracted from the magnetic board to the cells of the receiving member which are within an area designated for receiving magnetic particles of the specific color.

In particular, the magnetic board holder is laterally movable by a lateral moving member between the magnetic particles releasing area and the magnetic particles attracting area, and vertically movable by a vertical moving member between a down position and an up position, whereas the down position and the up position is separated by a distance which is sufficient to prevent the magnet from attracting magnetic particles from the magnetic board to the receiving member.

In particular, the lateral moving member and the vertical moving member are controlled by a control device. The lateral moving member and the vertical moving member are in form of pneumatic cylinders. In each of the operating positions, the magnetic board holder is moved from the down position to the up position at the magnetic particles releasing area after all the magnetic particles from the magnetic board are attracted to the receiving member.

The operation of the apparatus is as follows:

In an initial state, the magnetic board holder of each of the operating positions is at the magnetic particles releasing area in the up position, and there is no magnetic particle on the magnetic board;

In an operating state, the receiving member conveyor conveys the receiving members one by one each to one of the operating positions; the magnetic board holder of the operating position together with the magnetic board are moved laterally by the lateral moving member from the magnetic particles releasing area to the magnetic particles attracting area, and then moved vertically by the vertical moving member from the up position to the down position to enable the magnetic board to attract the magnetic particles received in the container at the magnetic particles attracting area; the magnetic board holder is then moved vertically by the vertical moving member from the down position to the up position, and then moved laterally by the lateral moving member from the magnetic particles attracting area to the magnetic particles releasing area; the magnetic board holder is moved vertically by the vertical moving member from the up position to the down position so that all the magnetic particles are attracted from the magnetic board to the receiving member by the magnet underneath the receiving member; the magnetic board holder is then moved vertically by the vertical moving member from the down position to the up position, thereby returning to the initial state;

The operation continues with the operating state and the initial state, until all the receiving members are completely filled with the magnetic particles.

The present invention makes use of magnetic force to ensure that magnetic particles of a specific color will be filled into cells designated for that specific color. As a result, the present invention is capable of manufacturing a magnetic drawing board with a clear division of areas of different colors. There is no longer any limitation on the size and shape of the areas of different colors in the present invention.

DETAILED DESCRIPTION OF THE INVENTION

The drawings below and a specific embodiment of the present invention will be described in details.

Figure 1:
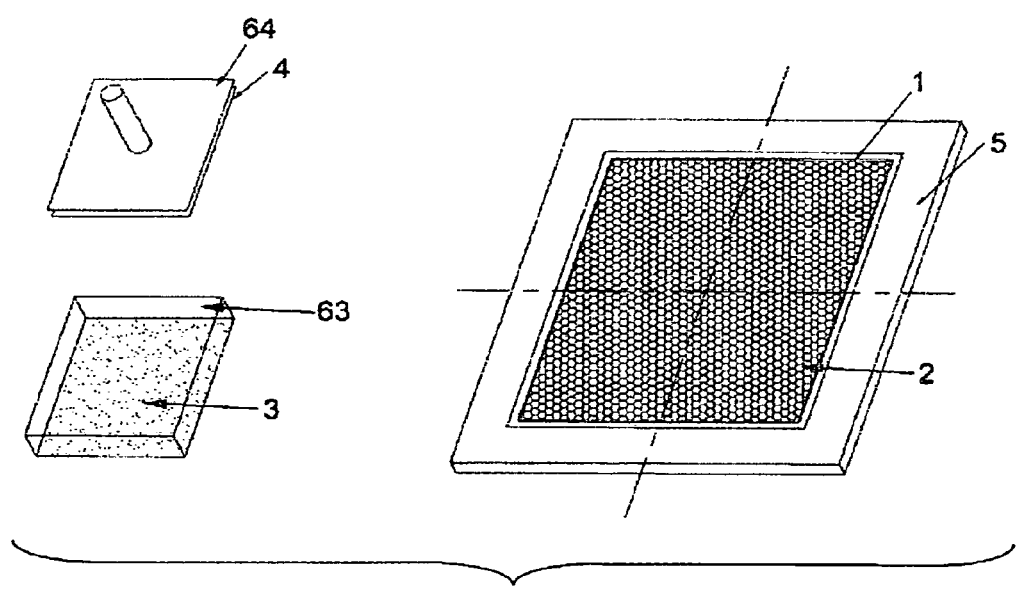
FIG. 1 is a schematic diagram illustrating elements of an embodiment of the method of the present invention.

According to an embodiment of the method of manufacturing a magnetic drawing board of the present invention as illustrated in FIG. 1, the method comprises the following steps:

(1) Providing a receiving member 1 having a plurality of cells 2 for receiving magnetic particles 3, wherein the cells 2 are divided into a plurality of areas and each of the areas is designated for receiving magnetic particles 3 of a specific color;

(2) Positioning a magnetic board 4 on top of magnetic particles 3 of a first specific color so that the magnetic particles 3 of the first specific color are attracted to the magnetic board 4, and thereafter positioning the magnetic board 4 attracted with the magnetic particles 3 of the first specific color in relation to the receiving member 1 in such a way that by means of a magnet 5 having a magnetic force stronger than that of the magnetic board 4 the magnetic particles 3 of the first specific color are attracted from the magnetic board 4 to the cells 2 of the receiving member 1 which are within a first one of the plurality of areas designated for receiving magnetic particles 3 of the first specific color;

(3) Repeating step (2) to fill the cells 2 of the receiving member 1 which are within a subsequent one of the plurality of areas designated for receiving magnetic particles 3 of a subsequent specific color, until all the cells 2 of the receiving member 1 are filled with magnetic particles 3;

(4) Filling all the cells 2 of the receiving member 1 with dispersion medium; and (5) Attaching an upper substrate onto the receiving member 1 in a sealed manner so that the cells 2 are sealed from each other, thereby forming the magnetic drawing board.

In this embodiment, the magnetic board 4 for attracting the magnetic particles 3 of the first specific color is of an area which is the same as the first one of the plurality of areas designated for receiving magnetic particles 3 of the first specific color. The magnet 5 is of an area which is larger than the first one of the plurality of areas designated for receiving magnetic particles 3 of the first specific color. In other embodiments, it is possible that the magnet 5 is of an area which is the same as the first one of the plurality of areas designated for receiving magnetic particles 3 of the first specific color, and the magnetic board 4 for attracting the magnetic particles 3 of the first specific color is of an area which is the same as or larger than the first one of the plurality of areas designated for receiving magnetic particles 3 of the first specific color. In further embodiments, it is also possible that the magnetic board 4 for attracting the magnetic particles 3 of the first specific color is of an area which is larger than the first one of the plurality of areas designated for receiving magnetic particles 3 of the first specific color; the magnet 5 is of an area which is larger than the first one of the plurality of areas designated for receiving magnetic particles 3 of the first specific color; the magnetic board 4 is attracted with magnetic particles 3 of the first specific color only at an area which is the same as the first one of the plurality of areas designated for receiving magnetic particles 3 of the first specific color, e.g. by positioning the magnetic board 4 on top of a container 31 which receives magnetic particles 3 of the first specific color, wherein the container 31 is cylindrical and has a cross section which is the same as the first one of the plurality of areas designated for receiving magnetic particles 3 of the first specific color.

In further embodiments, step (2) may comprise, simultaneously, positioning one or more further magnetic boards 4 each on top of magnetic particles 3 of a specific color, and thereafter positioning the one or more further magnetic boards 4 attracted with magnetic particles 3 in relation to the receiving member 1 in such a way that by means of the magnet 5 the magnetic particles 3 are attracted from the magnetic boards 4 to the cells 2 of the receiving member 1 so that each of the cells 2 receives magnetic particles 3 of the specific color designated for the cell 2. In particular, after the magnetic boards 4 are attracted with magnetic particles 3, the magnetic boards 4 are assembled to form an assembled magnetic board; then the assembled magnetic board is positioned in relation to the receiving member 1; and then the magnet 5 is positioned in such a way that the magnetic particles 3 are attracted from the assembled magnetic board to the cells 2 of the receiving member 1.

In this embodiment, the magnet 5 is positioned underneath the receiving member 1 after the magnetic board 4 attracted with the magnetic particles 3 is positioned above the receiving member 1. In other embodiments, before the magnetic board 4 attracted with magnetic particles 3 is properly positioned in relation to the receiving member 1, the receiving member 1 and the magnetic board 4 is separated from each other by a distance which is sufficient to prevent the magnet 5 from attracting the magnetic particles 3 from the magnetic board 4 to the receiving member 1.

Figure 2:
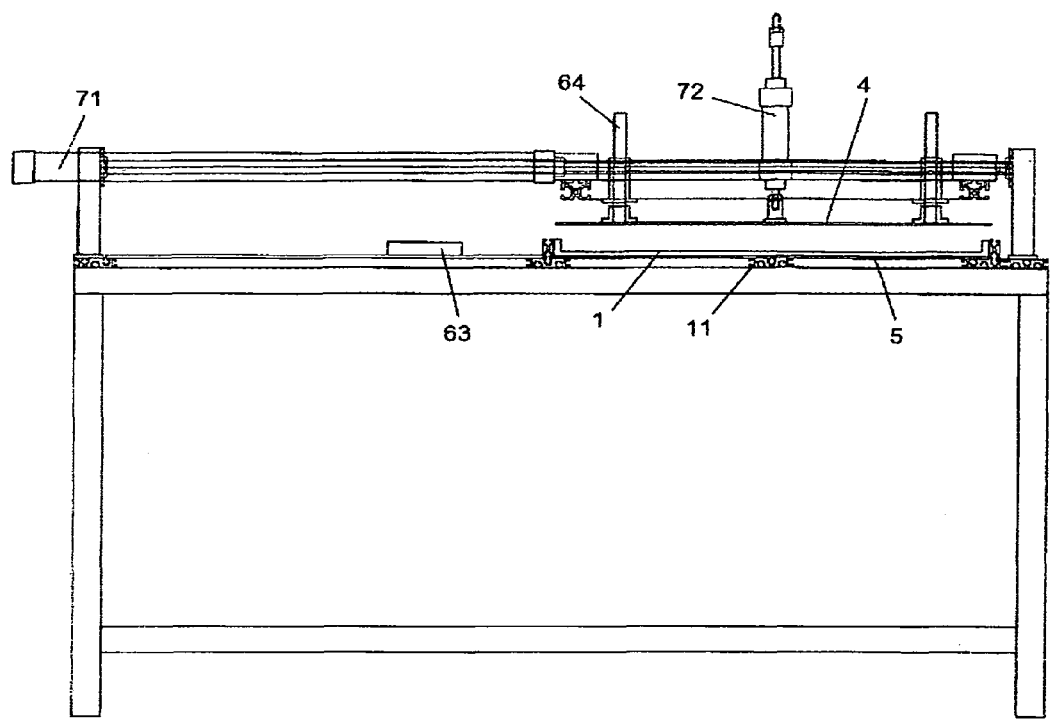
FIG. 2 is a schematic diagram illustrating an operating position of an embodiment of the apparatus of the present invention.
Figure 3:
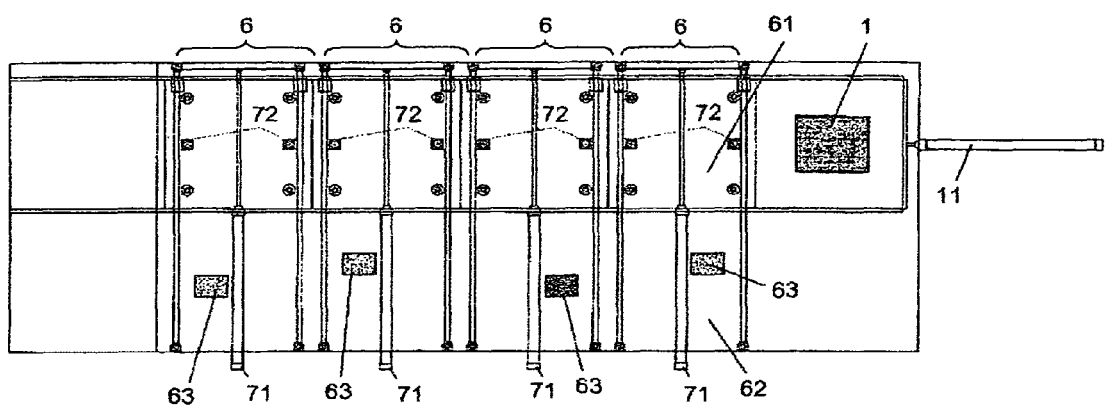
FIG. 3 is another schematic diagram illustrating the embodiment of the apparatus of the present invention.

As illustrated in FIGS. 2 and 3, an embodiment of the apparatus for filling receiving members of magnetic drawing boards with magnetic particles comprises a plurality of receiving members 1, a magnet 5 fixedly secured underneath each of the receiving members 1, and a receiving member conveyor 11. Each of the receiving members 1 has a plurality of cells 2 for receiving magnetic particles 3, wherein the cells 2 are divided into a plurality of areas and each of the areas is designated for receiving magnetic particles 3 of a specific color. The receiving member conveyor 11 conveys the receiving members 1 along a plurality of operating positions 6. Each of the operating positions 6 is disposed with a magnetic particles releasing area 61 for receiving the receiving member 1; a magnetic particles attracting area 62 which is laterally aligned with the magnetic particles releasing area 61; a container 63 for receiving magnetic particles 3 of a specific color, and the container 63 is disposed at the magnetic particles attracting area 62; a magnetic board holder 64 fixedly securely with a magnetic board 4; and the magnetic board holder 64 is movable between the magnetic particles releasing area 61 and the magnetic particles attracting area 62 so as to enable the magnetic board 4 to attract magnetic particles 3 from the container 63 and thereafter move to a position in relation to the receiving member 1 in such a way that by means of the magnet 5 which has a magnetic force stronger than that of the magnetic board 4 the magnetic particles 3 of the specific color are attracted from the magnetic board 4 to the cells 2 of the receiving member 1 which are within an area designated for receiving magnetic particles 3 of the specific color.

In this embodiment, the magnetic board holder 64 is laterally movable by a lateral moving member 71 between the magnetic particles releasing area 61 and the magnetic particles attracting area 62, and vertically movable by a vertical moving member 72 between a down position and an up position, whereas the down position and the up position is separated by a distance which is sufficient to prevent the magnet 5 from attracting magnetic particles 3 from the magnetic board 4 to the receiving member 1. The lateral moving member 71 and the vertical moving member 72 are controlled by a control device (not shown), and are in form of pneumatic cylinders. In each of the operating positions 6, the magnetic board holder 64 is moved from the down position to the up position at the magnetic particles releasing area 61 after all the magnetic particles 3 from the magnetic board 4 are attracted to the receiving member 1.

The operation of the apparatus is as follows:

In an initial state, the magnetic board holder 64 of each of the operating positions 6 is at the magnetic particles releasing area 61 in the up position, and there is no magnetic particle 3 on the magnetic board 4.

In an operating state, the receiving member conveyor 11 conveys the receiving members 1 one by one each to one of the operating positions 6; the magnetic board holder 64 of the operating position together with the magnetic board 4 are moved laterally by the lateral moving member 71 from the magnetic particles releasing area 61 to the magnetic particles attracting area 62, and then moved vertically by the vertical moving member 72 from the up position to the down position to enable the magnetic board 4 to attract the magnetic particles 3 received in the container 63 at the magnetic particles attracting area 62; the magnetic board holder 64 is then moved vertically by the vertical moving member 72 from the down position to the up position, and then moved laterally by the lateral moving member 71 from the magnetic particles attracting area 62 to the magnetic particles releasing area 61; the magnetic board holder 64 is moved vertically by the vertical moving member 72 from the up position to the down position so that all the magnetic particles 3 are attracted from the magnetic board 4 to the receiving member 1 by the magnet 5 underneath the receiving member 1; the magnetic board holder 64 is then moved vertically by the vertical moving member 72 from the down position to the up position, thereby returning to the initial state.

The operation continues with the operating state and the initial state, until all the receiving members 1 are completely filled with the magnetic particles 3.

The above embodiments are more preferred description of the present invention. However, description of the present invention is not limited by the above embodiments. Any other changes, modification, substitution, combinations and simplification not deviated from the spiritual essence and principle of the present invention are equivalent replacement and they all fall into the scope of protection of the present invention.

What is claimed is:

1. A method of manufacturing a magnetic drawing board, wherein the method comprises the steps of:
    (1) Providing a receiving member having a plurality of cells for receiving magnetic particles, wherein the cells are divided into a plurality of areas and each of the areas is designated for receiving magnetic particles of a specific color;
    (2) Positioning a magnetic board on top of magnetic particles of a first specific color so that the magnetic particles of the first specific color are attracted to the magnetic board, and thereafter positioning the magnetic board attracted with the magnetic particles of the first specific color in relation to the receiving member in such a way that by means of a magnet having a magnetic force stronger than that of the magnetic board the magnetic particles of the first specific color are attracted from the magnetic board to the cells of the receiving member which are within a first one of the plurality of areas designated for receiving magnetic particles of the first specific color;
    (3) Repeating step (2) to fill the cells of the receiving member which are within a subsequent one of the plurality of areas designated for receiving magnetic particles of a subsequent specific color, until all the cells of the receiving member are filled with magnetic particles;
    (4) Filling all the cells of the receiving member with dispersion medium; and
    (5) Attaching an upper substrate onto the receiving member in a sealed manner so that the cells are sealed from each other, thereby forming the magnetic drawing board.

2. The method as in claim 1, wherein the magnetic board for attracting the magnetic particles of the first specific color is of an area which is the same as the first one of the plurality of areas designated for receiving magnetic particles of the first specific color; the magnet is of an area which is the same as or larger than the first one of the plurality of areas designated for receiving magnetic particles of the first specific color.

3. The method as in claim 1, wherein the magnet is of an area which is the same as the first one of the plurality of areas designated for receiving magnetic particles of the first specific color; the magnetic board for attracting the magnetic particles of the first specific color is of an area which is the same as or larger than the first one of the plurality of areas designated for receiving magnetic particles of the first specific color.

4. The method as in claim 1, wherein the magnetic board for attracting the magnetic particles of the first specific color is of an area which is larger than the first one of the plurality of areas designated for receiving magnetic particles of the first specific color; the magnet is of an area which is larger than the first one of the plurality of areas designated for receiving magnetic particles of the first specific color; the magnetic board is attracted with magnetic particles of the first specific color only at an area which is the same as the first one of the plurality of areas designated for receiving magnetic particles of the first specific color.

5. The method as in claim 4, wherein the magnetic board is attracted with magnetic particles of the first specific color only at an area which is the same as the first one of the plurality of areas designated for receiving magnetic particles of the first specific color by positioning the magnetic board on top of a container which receives magnetic particles of the first specific color, wherein the container is cylindrical and has a cross section which is the same as the first one of the plurality of areas designated for receiving magnetic particles of the first specific color.

6. The method as in claim 1, wherein step (2) simultaneously comprises: positioning one or more further magnetic boards each on top of magnetic particles of a specific color, and thereafter positioning the one or more further magnetic boards attracted with magnetic particles in relation to the receiving member in such a way that by means of the magnet the magnetic particles are attracted from the magnetic boards to the cells of the receiving member so that each of the cells receives magnetic particles of the specific color designated for the cell.

7. The method as in claim 6, wherein after the magnetic boards are attracted with magnetic particles, the magnetic boards are assembled to form an assembled magnetic board; then the assembled magnetic board is positioned in relation to the receiving member; and then the magnet is positioned in such a way that the magnetic particles are attracted from the assembled magnetic board to the cells of the receiving member.

8. The method as in claim 1, wherein in step (2), the magnet is positioned underneath the receiving member after the magnetic board attracted with the magnetic particles is positioned above the receiving member.

9. The method as in claim 1, wherein in Step (2), before the magnetic board attracted with magnetic particles is properly positioned in relation to the receiving member, the receiving member and the magnetic board is separated from each other by a distance which is sufficient to prevent the magnet from attracting the magnetic particles from the magnetic board to the receiving member.

10. An apparatus for filling receiving members of magnetic drawing boards with magnetic particles, comprising:
    one or more receiving members, each of which has a plurality of cells for receiving magnetic particles, wherein the cells are divided into a plurality of areas and each of the areas is designated for receiving magnetic particles of a specific color;
    a magnet fixedly secured underneath each of the receiving members;
    a receiving member conveyor for conveying the receiving members along a plurality of operating positions;

each of the operating positions is disposed with:
- a magnetic particles releasing area for receiving the receiving member;
- a magnetic particles attracting area which is laterally aligned with the magnetic particles releasing area;
- a container for receiving magnetic particles of a specific color, and the container is disposed at the magnetic particles attracting area;
- a magnetic board holder fixedly securely with a magnetic board; and
- the magnetic board holder is movable between the magnetic particles releasing area and the magnetic particles attracting area so as to enable the magnetic board to attract magnetic particles from the container and thereafter move to a position in relation to the receiving member in such a way that by means of the magnet which has a magnetic force stronger than that of the magnetic board the magnetic particles of the specific color are attracted from the magnetic board to the cells of the receiving member which are within an area designated for receiving magnetic particles of the specific color.

11. The apparatus as in claim 10, wherein the magnetic board holder is laterally movable by a lateral moving member between the magnetic particles releasing area and the magnetic particles attracting area, and vertically movable by a vertical moving member between a down position and an up position, whereas the down position and the up position is separated by a distance which is sufficient to prevent the magnet from attracting magnetic particles from the magnetic board to the receiving member.

12. The apparatus as in claim 11, wherein the lateral moving member and the vertical moving member are controlled by a control device.

13. The apparatus as in claim 11, wherein the lateral moving member and the vertical moving member are in form of pneumatic cylinders.

14. The apparatus as in claim 11, wherein in each of the operating positions, the magnetic board holder is moved from the down position to the up position at the magnetic particles releasing area after all the magnetic particles from the magnetic board are attracted to the receiving member.

* * * * *